US006410879B1

(12) United States Patent
Schwankhart

(10) Patent No.: US 6,410,879 B1
(45) Date of Patent: Jun. 25, 2002

(54) DEVICE WITH A PLASMA TORCH

(75) Inventor: Gerhard Schwankhart, Attnang-Puchheim (AT)

(73) Assignee: Inocon Technologie Ges.m.b.H, Attnang-Puchheim (AT)

( * ) Notice: Subject to any disclaimer, the term of this patent is extended or adjusted under 35 U.S.C. 154(b) by 0 days.

(21) Appl. No.: 09/883,412

(22) Filed: Jun. 18, 2001

(30) Foreign Application Priority Data

Jun. 21, 2000 (AT) ........................................ 453/2000 U

(51) Int. Cl.7 ................................................ B23K 10/00

(52) U.S. Cl. ............................ 219/121.52; 219/121.45; 219/75

(58) Field of Search ......................... 219/121.47, 76.15, 219/76.16, 121.48, 121.45, 121.46, 75; 313/231.31, 231.41

(56) References Cited

U.S. PATENT DOCUMENTS 5,811,752 A * 9/1998 Titus et al. ............ 219/121.27
5,932,116 A * 8/1999 Matsumoto et al. ... 219/121.57
6,121,571 A * 9/2000 Siniaguine et al. .... 219/121.54

FOREIGN PATENT DOCUMENTS

DE 29 26 210 2/1981
JP 11117845 4/1999

* cited by examiner

*Primary Examiner*—Mark Paschall
(74) *Attorney, Agent, or Firm*—Collard & Roe, P.C.

(57) ABSTRACT

A device with a plasma torch with a rod-shaped non-consumable electrode which is held in a receiver, is connected with an electric connection and penetrates a nozzle which is in connection with a gas connection. In order to also enable the rapid and secure welding of difficult alloys it is provided that a further rod-shaped non-consumable electrode is disposed in the receiver which is made from an electrically non-conducting material, which further electrode also penetrates a nozzle which is in connection with a gas connection, with the two electrodes enclosing an acute angle and each being in connection with a separate voltage source supplying direct voltage pulses, the level of which exceeds at least the arc voltage of an arc between one of the electrodes and a counterelectrode which is associated with the same and connected with the same voltage source.

13 Claims, 5 Drawing Sheets

DEVICE WITH A PLASMA TORCH

BACKGROUND OF THE INVENTION

1. Field of the Invention

The invention relates to a device with a plasma torch.

2. Description of the Prior Art

Such devices with merely one rod-shaped electrode are used for the welding of light metal and light metal alloys. In order to achieve a high welding speed at deep fusion penetration and narrow seems, the rod-shaped electrode is used as a cathode, and helium is used as a plasma gas. A very hot plasma is obtained which evaporates thin oxide layers. This is not the case in all light metal alloys, however.

In order to enable the welding of such alloys, too, welding is performed with direct current instead of alternating current, or the electrode is connected to the plus pole of the voltage source. Although a continual removal of the oxide layers is ensured and a welded joint is ensured which is free from cavities because the oxide skin is continuously torn open, this advantage is offset by the disadvantage of a welding speed which is reduced by approximately two-thirds as compared with a d.c. helium welding and a considerable increase of the width of the weld seams, resulting in an increased heat influence zone.

SUMMARY OF THE INVENTION

It is the object of the present invention to avoid such disadvantages and to provide a device of the kind mentioned above, which allows a high welding speed in difficult alloys, too, and which also ensures that any oxide layers are removed.

This is achieved with a device with a plasma torch, which comprises a receiver made from an electrically non-conducting material, two rod-shaped non-consumable electrodes held in nozzles in the receiver, the electrodes enclosing an acute angle, and a counterelectrode associated with the non-consumable electrodes. A separate voltage source is connected to each non-consumable electrode and the voltage sources are also connected to the counterelectrodes. Each voltage source has a plus pole and a minus pole, one of the non-consumable electrodes being connected to the plus pole and the other non-consumable electrode being connected to the minus pole. The voltage sources supply direct voltage pulses having a level exceeding at least the arc voltage of an arc between the non-consumable electrodes, and mutually locked switching devices prevent a simultaneous voltage supply from the voltage sources to the non-consumable electrodes and supply voltage at different polarization to the non-consumable electrodes. A gas supply is connected to the nozzles.

With such a device, it is possible to connect the two rod-shaped electrodes with different poles of the voltage source. As a result, plasma pulses which are produced with an electrode connected to the plus pole of a voltage source can be used to tear open the oxide layers, and with the subsequent plasma pulses connected with the minus pole of a voltage source and, therefore, produced by an electrode used as a cathode, it is possible to weld the basic material in a clean manner and with a high penetration depth, with very narrow and smooth weld seams being obtained. By locking the respective switching devices, which each only allow voltage pulses of approximately 1 to 5 milliseconds, it is ensured that only one electrode can be charged.

The workpiece to be welded can appropriately be used as a counterelectrode. It is also possible to make the nozzle or the nozzle body from an electrically conductive material and to use the same as a counterelectrode.

In the case of alloys that can be welded more easily, both electrodes may be used as cathodes. This leads to the advantage that the required welding energy can be divided among both electrodes and they can, therefore, be provided in a narrower housing. This allows the production of very narrow receiving means of 9 mm width, for example. With such devices, it is, therefore, also possible to weld in corner zones of workpieces which are difficult to access, which substantially facilitates the structural design of such devices.

The two separate voltage sources may also be controlled with respect to the pulse length and pulse power, thus enabling an adaptation to various requirements.

The ignition of each plasma arc may be made by means of a high-frequency pulse when the level of the voltage of the individual voltage pulses does not exceed the breakdown voltage of the path between the electrode and the respective counterelectrode. The ignition can also be initiated by high voltage pulses which exceed the respective breakdown voltage.

Very favorable conditions for the welding of very difficult alloys are obtained if a workpiece to be welded is connected to one pole of each voltage source, and the non-consumable electrodes are connected to different poles of the voltage sources, the non-consumable electrode connected to the plus pole being disposed at the front, as seen in the direction of welding. It ha s also been proven to be advantageous if the non-consumable electrodes enclose an angle of 20° to 70°, preferably 30°, with the electrode switched as a cathode preferably standing perpendicularly to the workpiece.

The wear and tear of the electrode connected to the plus pole and subject to higher stresses may be kept at a very low level if this electrode has a substantially blunt free end projecting from the nozzle in which it is held, and the non-consumable electrode connected to the minus pole has a substantially conical free end projecting from the nozzle in which it is held.

It must be ensured that the higher stressed electrode is cooled sufficiently well, and in a simple arrangement for this purpose, the device comprises a cooling conduit in the receiver, the cooling conduit having an inlet and an outlet, the non-consumable electrodes being held in the receiver in holders, the holders passing through chambers which are connected to each other by the cooling conduit, and the chamber through which the holder for the non-consumable electrode connected to the plus pole passes being connected to the inlet.

A device wherein at least the nozzle holding the non-consumable electrode connected to the minus pole is made of an electrically well-conducting material, preferably further comprises a high-resistance resistor having a resistance of $10^3$ to $10^6$ ohms, which connects this nozzle to the pole connected to a workpiece to be welded. This allows achieving an ionization of the plasma gas flowing from the nozzle in the zone between the electrode and the nozzle as a result of a high-frequency arc-over. This produces the ignition of an arc between the electrode and the workpiece as a result of the applied direct voltage. This leads to a substantial protection of the plasma torch because the same is not encumbered by the otherwise common pilot arc.

As a result of the ionization by the high-frequency arc-over, which imposes only very low thermal stressed on the nozzle, it is also possible when using helium as a plasma gas to easily ignite over larger distances between the electrode and workpiece of 10 mm, for example.

The use of a nozzle which is made from an electrically well-conducting material and its connection via a high-resistance electric resistor with the pole of the voltage source which is connected with the workpiece is also of advantage in devices in accordance with the invention in which the plus pole of the voltage source is connected with the electrode held in the nozzle.

It is desirable to produce a constriction of the plasma and avoid a divergence of the same due to the friction of the plasma in the air which emerges with a high speed so that a very high concentration of the energy is achieved. For this purpose, the non-consumable electrode connected to the minus pole has a substantially conical free end projecting from the nozzle in which it is held, and said nozzle has a conical surface extending substantially parallel to the conical free end, the cone angle being about 20°. Also, the device may further comprise cold gas conduits connected to a source of cold gas and distributed evenly and concentrically about an axis of a bore of at least one of the nozzles, the cold gas conduits being open at a nozzle end face from which a free end of the non-consumable electrode held therein projects, the axes of the cold gas conduits forming a conical generatrix whose apex is disposed before the free electrode end.

BRIEF DESCRIPTION OF THE DRAWING

The invention will now be explained in more detail by reference to the accompanying drawing, wherein.

DESCRIPTION OF THE PREFERRED EMBODIMENTS

Figure 2:
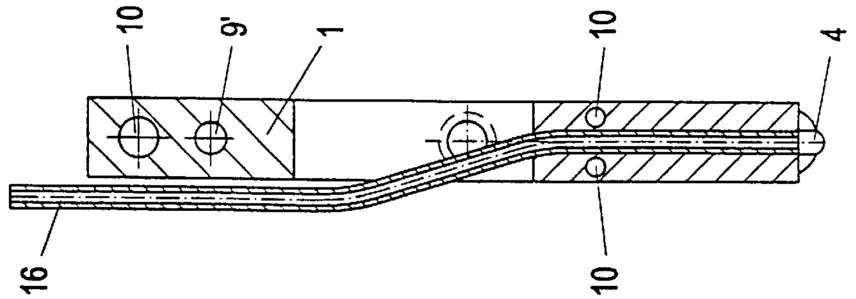
FIG. 2 shows a transverse cross-sectional view of the device of FIG. 1.
Figure 1:
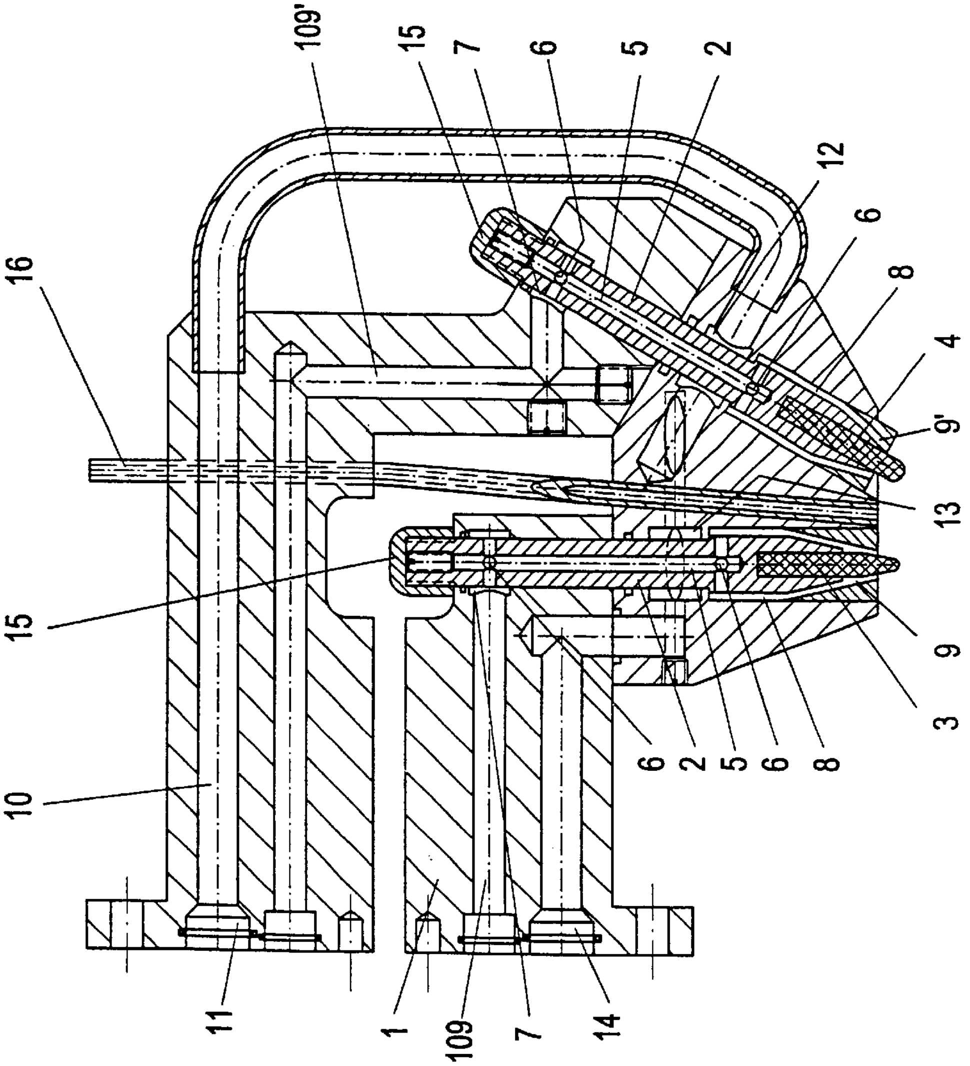
FIG. 1 shows a sectional view of a first embodiment of the device in accordance with the invention.

A receiver 1 is provided in the embodiment of FIGS. 1 and 2, which receiver is made from an electrically insulating material. Two holding devices 2 are inserted in receiver 1, at the end of which are held two electrodes 3, 4 made of a thermally stable material, such as tungsten.

The holding devices 2 are made of an electrically well-conducting material and are provided with a central bore 5 connected near its upper and lower end by radial bores 6 with chambers 7, 8, a respective one of which is connected with a gas conduit 109, 109' through which plasma gas can be supplied separately. Chambers 7, 8 are respectively connected with an ejection nozzle 9, 9'.

Nozzles 9, 9' are provided with conical inner walls, with the inner wall of nozzle 9 extending substantially parallel to the conical end zone of electrode 3. The free end of the electrode 3 may be flattened. The electrode 4 is provided with a substantially blunt end in contrast to electrode 3.

Furthermore, a cooling conduit 10 is provided in the receiver 1, which conduit leads from an inlet 11 to an annular chamber 12 through which holding device 2 of the electrode 4, and from chamber 12, divided into two branch conduits (FIG. 2), leads to a further annular chamber 13. Holding device 2 of the electrode 3 passes through chamber 13, which leads to an outlet 14.

The electric connection of the two electrodes 3, 4 and their holding devices 2 may be provided through screw caps 15 or, if the gas conduits 109, 109' are provided with electrically conducting walls, by these walls. In the latter case, the connection may be made by connecting nipples through which gas is supplied.

In the embodiment of FIGS. 1 and 2, a tubular guide means 16 is provided between the nozzles 9, 9', which guide means is provided for guiding a wire used as an additional material. The guide means 16 is offset.

As can be seen from FIG. 2, the receiver 1 may have a very narrow structure.

In the embodiment of FIGS. 1 and 2, the electrode 3 extends in the operational position of the receiver 1 in a substantially vertical direction, and the electrode 4 encloses with the same an acute angle, which may be 20° to 70°.

Figure 3:
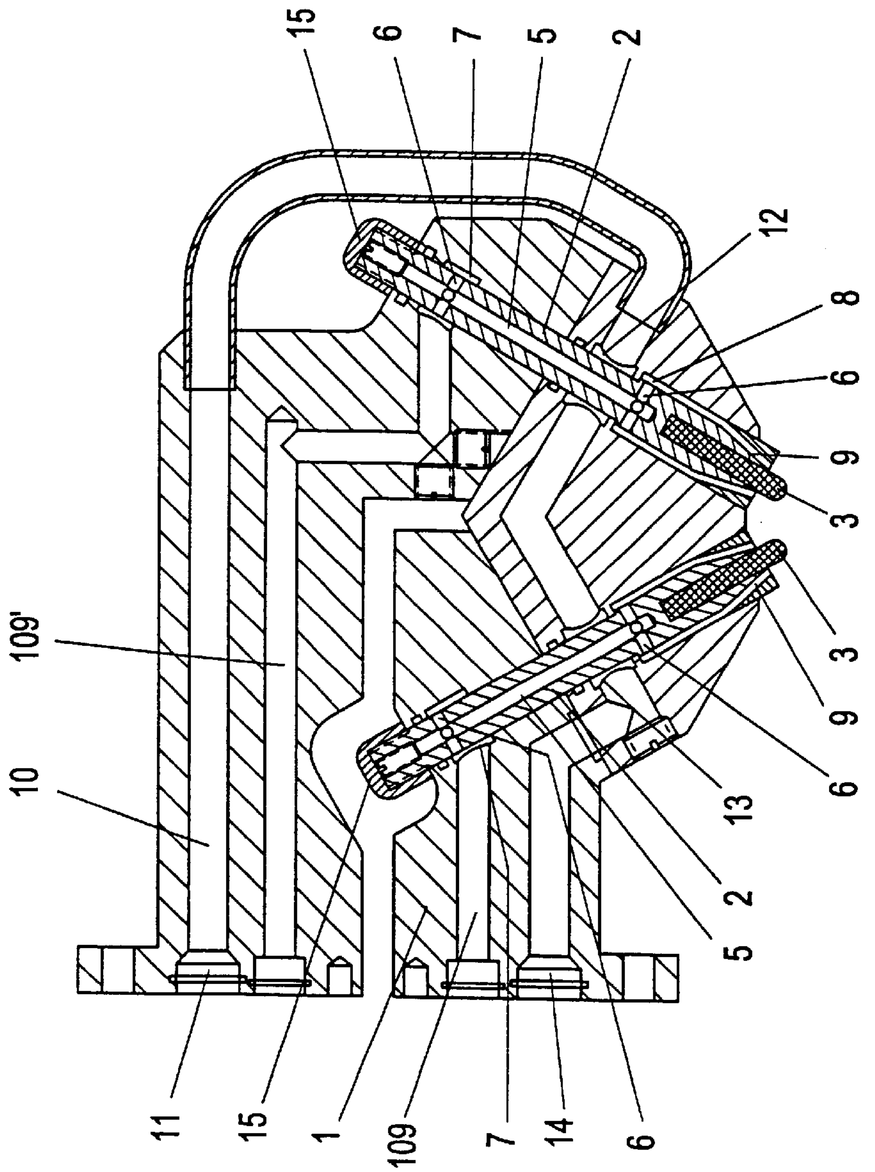
FIG. 3 shows a sectional view of a second embodiment of the device in accordance with the invention.
Figure 4:
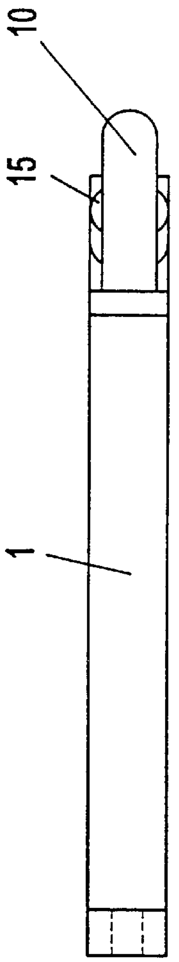
FIG. 4 shows a top view of the device of FIG. 3.

In the embodiment of FIGS. 3 and 4, two like electrodes 3 are provided, both enclosing an angle with the perpendicular.

Figure 5:
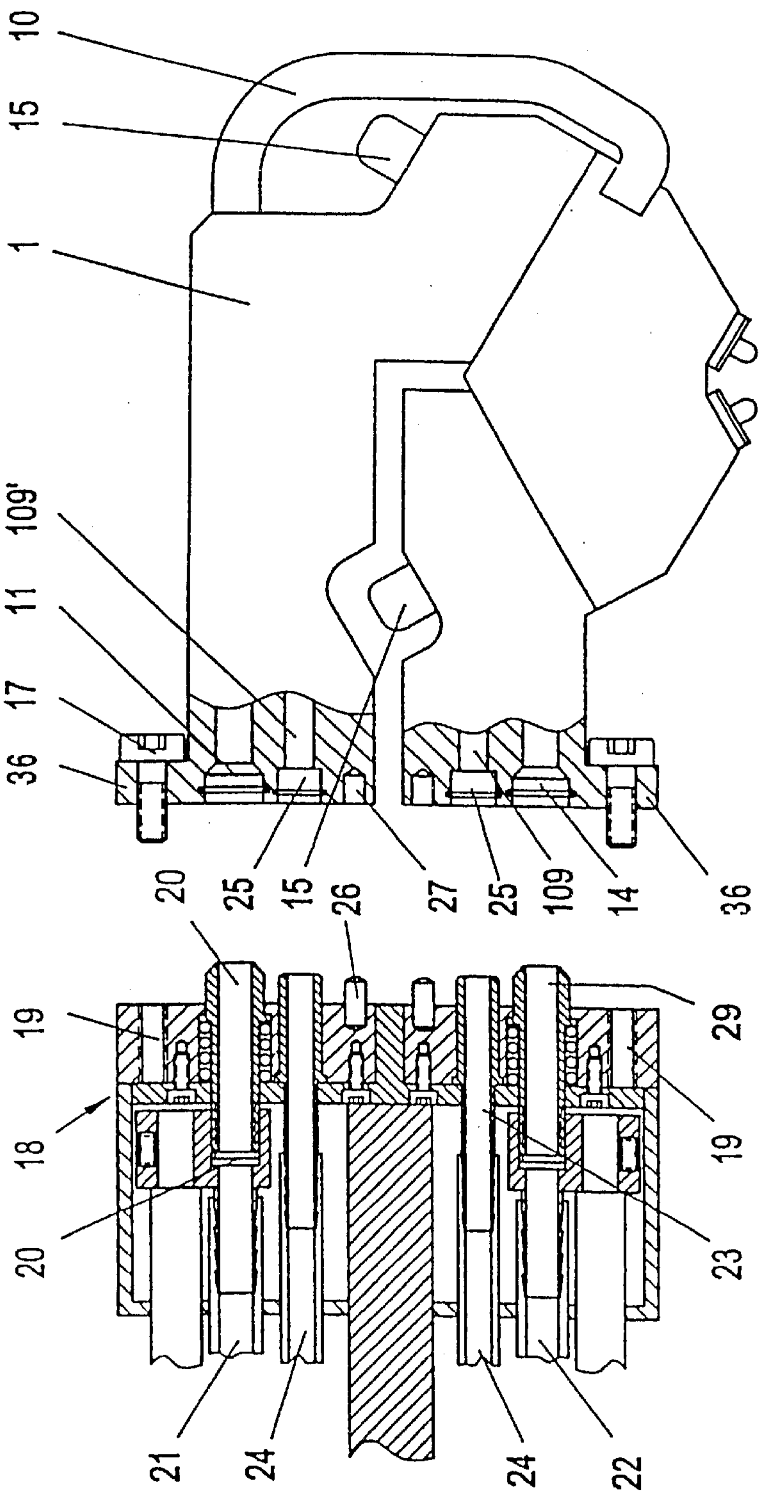
FIGS. 5 and 6 show the device of FIGS. 3 and 4 with a power supply unit, shown in a partially sectioned elevational view and in a top view, respectively.
Figure 6:
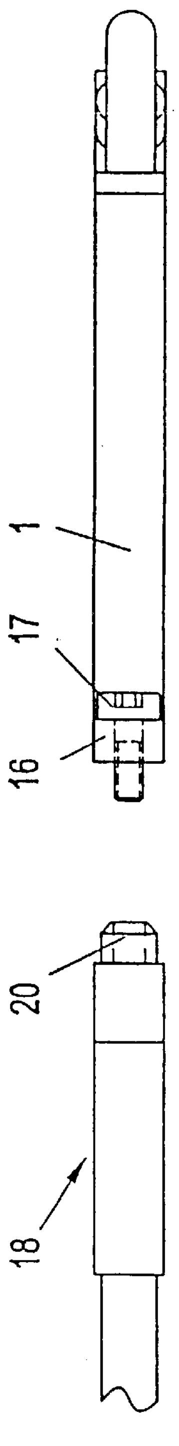

As is shown in FIG. 5, the receiver 1 of FIG. 3 is provided with flange-like projections 36 through which screws 17 pass to fasten receiver 1 to a connecting head 18, with the screws 17 engaging in threaded bores 19 of the connecting head 18.

Spring-biased connecting nipples 20 are held axially displaceably in connecting head 18, to which a water supply line 21 and a water discharge line 22 for supplying and discharging cooling water are connected. Spring-biased connecting nipples 20 engage, when the receiver 1 is attached, the inlet and outlet 11, 14 of the receiver. Fixed connecting nipples 23 are also provided in connecting head 18, to which gas lines 24 are connected, which convey helium for example. The fixed connecting nipples 23 engage the inlets 25 of the gas conduits 109, 109' when the receiver 1 is attached. O-rings are used for sealing in the inlets 25, as well as in the inlet and outlet 11, 14.

Furthermore, a respective pin 26 arranged off-center in the connecting head 18 engages in a respective bore 27 of receiver 1. This ensures that a connection of receiver 1 to the connecting head is only possible in a predetermined position in which the correct flow of the gas and cooling conduits is provided.

If desired, a receiver 1 equipped with different electrodes 3, 4 (see FIG. 1) may readily be exchanged for the receiver shown in FIG. 5 for attachment to connecting head 18.

Figure 7:
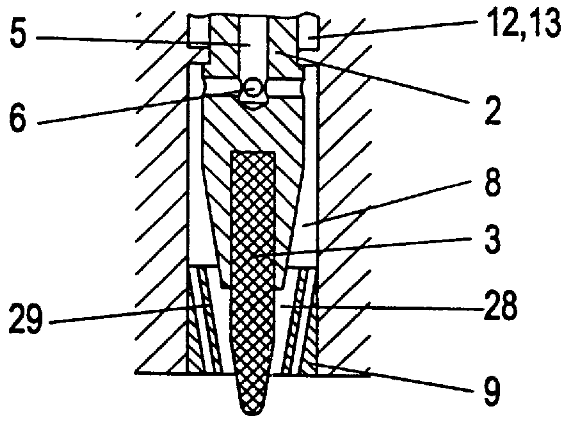
FIG. 7 shows a detail of the nozzle area.

FIG. 7 shows a detail of the nozzle body 9 for an electrode 3 which is provided with a conical end. The inner wall of the nozzle body 9 extends substantially parallel to the conical end of electrode 3. This arrangement ensures that the plasma gas emerges directed in an inclined manner against the axis of nozzle 9, therefore counteracting the tendency of the emerging plasma to diverge with increasing distance from the orifice of nozzle 9 owing to friction in the ambient air. As a result, only a small arc spot is obtained in a desired manner on the workpiece to be processed.

Cold gas conduits 29 are provided in the nozzle body 9 and enclose its conical nozzle bore 28. Said conduits are evenly distributed concentrically about the nozzle bore 28. The axes of cold gas conduits 29, usually provided in odd numbers such as 3, 5 or 7, form a generatrix of a conical surface whose axis is coaxial to the axis of the nozzle bore 28. Cold gas conduits 29 are open towards the chamber 8 and open at the end face of the nozzle body 9.

The plasma gas flowing through these cold gas conduits produces a cooling of the nozzle body 9, on the one hand, and a further constriction of the plasma emerging from the nozzle 9, on the other hand, and thus a reduction of the arc spot and a corresponding increase in the energy concentration in the same. The supply of the chamber 8 with plasma gas is performed through gas conduit 109, 109', the upper radial bores 6 of the holder 2, its central bore 5 and the lower radial bores 6.

Figure 8:
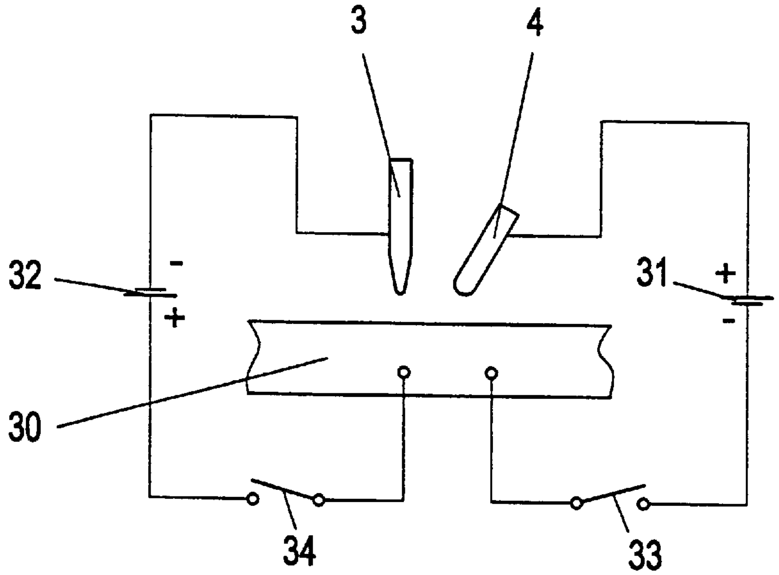
FIG. 8 schematically shows the electric power supply of the device.
Figure 9:
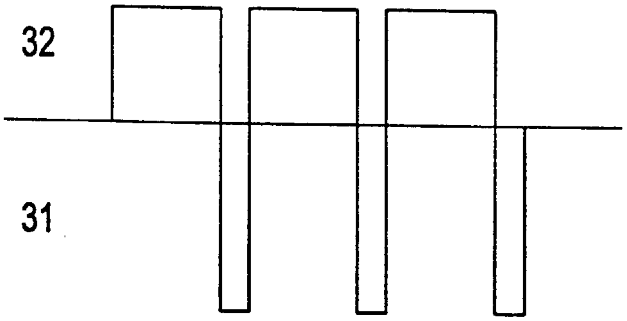
FIG. 9 shows a diagram of the progress over time of the voltage charging of the electrodes of a device in accordance with the invention.

FIG. 8 schematically shows the connection of the device in accordance with the invention. The electrodes 3, 4 are each connected with a pole of a voltage source 31, 32 each whose respective second pole is connected via a switching device 33, 34 to a workpiece 30.

The two switching devices 33, 34 are mutually locked, so that only one switching device 33 or 34 can be switched through. Only short switch-through times are provided for the two switching devices 33, 34 so that the electrodes 3, 4 can only be charged in pulses.

For numerous applications, the electrode 3, which is disposed at the back as seen in the welding direction, is a cathode connected to the minus pole of the voltage source 32.

Typical values are a current application of approx. 170A for a time of approx. 15 min. each and a break of approx. 3 min. During this time, the switching device 33 switches through and the electrode 4 connecting the plus pole of the current source 31 is charged with approx. 250A for approx. 3 min.

With such a mode of operation, it is possible to favorably and rapidly weld even alloys which are difficult to weld because by charging the electrode 4 the plasma pulses thus produced will securely tear open any oxide skins, and the basic material can be welded very favorably with the subsequent plasma pulses which are produced by charging the electrode 3.

For certain applications, it is also possible to insert two like electrodes 3 in the receiver 1 and to connect both with the minus pole of one direct voltage source 32 and to charge the same substantially alternatingly. Overlap periods can also be provided, however. Since in this way, the stress on each electrode 3 is low, electrodes 3 with a small diameter can be used, thus enabling the construction of the receiver with a narrow design.

Figure 10:
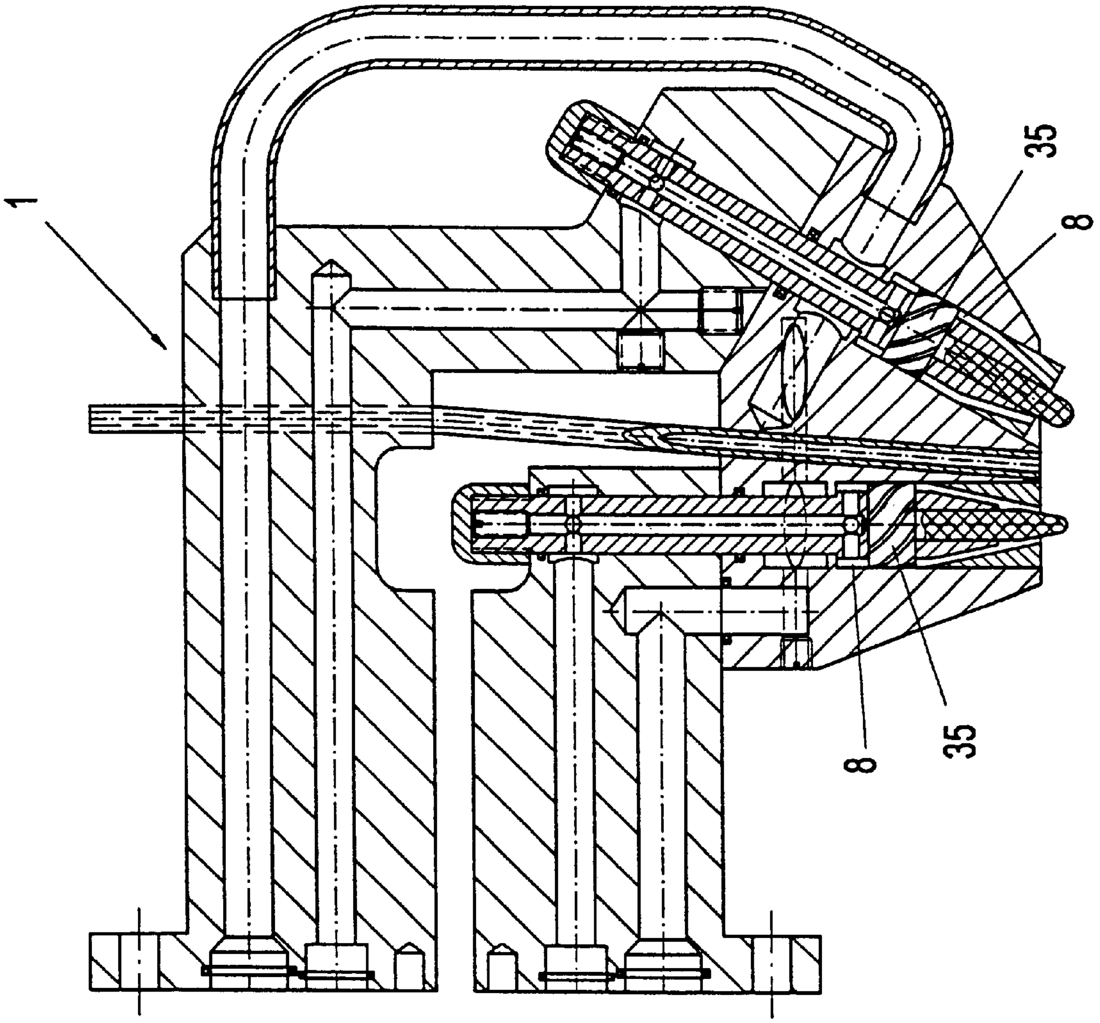
FIG. 10 shows a modified embodiment according to FIGS. 1 and 2 in a sectional view.

The embodiment of FIG. 10 differs from the one of FIGS. 1 and 2 by helical ribs 35 arranged in the chambers 8 which are in connection with the gas connections through the gas conduits 109, 109', with helically extending conduits remaining between said helical ribs through which the plasma gas flows to the nozzles 9, 9'. The plasma gas flow is subjected to a twist which leads to a stabilization of the plasma emerging at a high speed from the nozzles 9, 9', thus substantially preventing any divergence of the plasma due to friction in the substantially static air and thus leading to a very small arc spot with high energy density on the workpiece 30 to be processed.

What is claimed is:

1. A device with a plasma torch, which comprises (a) a receiver made from an electrically non-conducting material, (b) two rod-shaped non-consumable electrodes held in nozzles in the receiver, (1) the electrodes enclosing an acute angle, (c) a counterelectrode associated with the non-consumable electrodes, (d) a separate voltage source connected to each non-consumable electrode and the voltage sources being also connected to the counterelectrodes, each voltage source having a plus pole and a minus pole, one of the non-consumable electrodes being connected to the plus pole and the other non-consumable electrode being connected to the minus pole, (1) the voltage sources supplying direct voltage pulses having a level exceeding at least the arc voltage of an arc between the non-consumable electrodes, (e) mutually locked switching devices preventing a simultaneous voltage supply from the voltage sources to the non-consumable electrodes and supplying voltage at different polarization to the non-consumable electrodes, and (f) a gas supply connected to the nozzles.

2. The device of claim 1, wherein the non-consumable electrodes enclose an angle of 20° to 70°.

3. The device of claim 2, wherein the angle is 30°.

4. The device of claim 1, wherein a workpiece to be welded is connected to one pole of each voltage source, and the non-consumable electrodes are connected to different poles of the voltage sources, the non-consumable electrode connected to the plus pole being disposed at the front, as seen in the direction of welding.

5. The device of claim 4, wherein the non-consumable electrode connected to the plus pole has a substantially blunt free end projecting from the nozzle in which it is held, and the non-consumable electrode connected to the minus pole has a substantially conical free end projecting from the nozzle in which it is held.

6. The device of claim 1, further comprising a cooling conduit in the receiver, the cooling conduit having an inlet and an outlet, the non-consumable electrodes being held in the receiver in holders, the holders passing through chambers which are connected to each other by the cooling conduit, and the chamber through which the holder for the non-consumable electrode connected to the plus pole passes being connected to the inlet.

7. The device of claim 1, wherein at least the nozzle holding the non-consumable electrode connected to the minus pole is made of an electrically well-conducting material, further comprising a high-resistance resistor having a resistance of $10^3$ to $10^6$ ohms connecting said nozzle to the pole connected to a workpiece to be welded.

8. The device of claim 1, wherein at least the nozzle holding the non-consumable electrode connected to the plus pole is made of an electrically well-conducting material, further comprising a high-resistance resistor having a resistance of $10^3$ to $10^6$ ohms connecting said nozzle to the pole connected to a workpiece to the welded.

9. The device of claim 1, further comprising a guide means arranged in the receiver between the nozzles, for guiding a wire used as additional material in welding.

10. The device of claim 1, wherein the non-consumable electrode connected to the minus pole has a substantially conical free end projecting from the nozzle in which it is held, and said nozzle has a conical surface extending substantially parallel to the conical free end, the cone angle being about 20°.

11. The device of claim 1, wherein the nozzle holding the non-consumable electrode connected to the plus pole is substantially cylindrical, an inner wall of the nozzle and said electrode defining a substantially constant annular gap therebetween.

12. The device of claim 1, further comprising cold gas conduits connected to a source of cold gas and distributed evenly and concentrically about an axis of a bore of at least one of the nozzles, the cold gas conduits being open at a nozzle end face from which a free end of the non-consumable electrode held therein projects, the axes of the cold gas conduits forming a conical generatrix whose apex is disposed before the free electrode end.

13. The device of claim 1, further comprising a chamber surrounding a holder in which the electrode is held, the chamber being connected to a source of gas, and helical ribs extending along a wall of the chamber whereby helical gas conduits extend therealong.

* * * * *